July 13, 1926.

J. W. VAIL

ANIMAL TRAP

Filed Jan. 15, 1926

Inventor

J. W. Vail.

By

Lacey & Lacey, Attorneys

July 13, 1926.

J. W. VAIL

ANIMAL TRAP

Filed Jan. 15, 1926

Inventor

J. W. Vail.

By

Lacy & Lacy, Attorneys

Patented July 13, 1926.

1,592,397

UNITED STATES PATENT OFFICE.

JOHN WESLEY VAIL, OF AKRON, OHIO.

ANIMAL TRAP.

Application filed January 15, 1926. Serial No. 81,518.

This invention relates to traps and more particularly to one of the trap door type.

One object of the invention is to produce a trap of this character which may be partially embedded in the ground so that animals may readily pass into the trap through entrances disposed close to the ground.

Another object of the invention is to so construct the trap that an animal entering the trap will be directed onto a trap door and the weight of the animal cause the trap door to be swung downwardly and precipitate the animal into the bottom of the housing.

Another object of the invention is to provide the housing of the trap with opposed entrances to communicate with interrupted portions of an animal runway so that animals moving along the runway in either direction may readily enter the housing and be precipitated into the lower portion of the housing through the medium of the trap doors.

Another object of the invention is to provide improved bait holders disposed adjacent the inner ends of tunnels leading inwardly from the entrances so that the animals will be enticed into the trap by the bait but may not reach the bait.

Another object of the invention is to so mount the bait holders that access to them may be had through a single opening formed in the top of the trap and normally closed by a door adapted to be removably held in a closed position.

Another object of the invention is to produce a trap which may be formed of sheet metal and will be light in weight and at the same time strong and durable and permitted to be buried in the ground without injury to the material from which the trap is formed.

This invention is illustrated in the accompanying drawings, wherein

Fig. 4 is a fragmentary sectional view through one corner portion of the housing along the line 4—4 of Fig. 1, and Fig. 5 is a perspective view of one of the bait holders.

Figure 1:
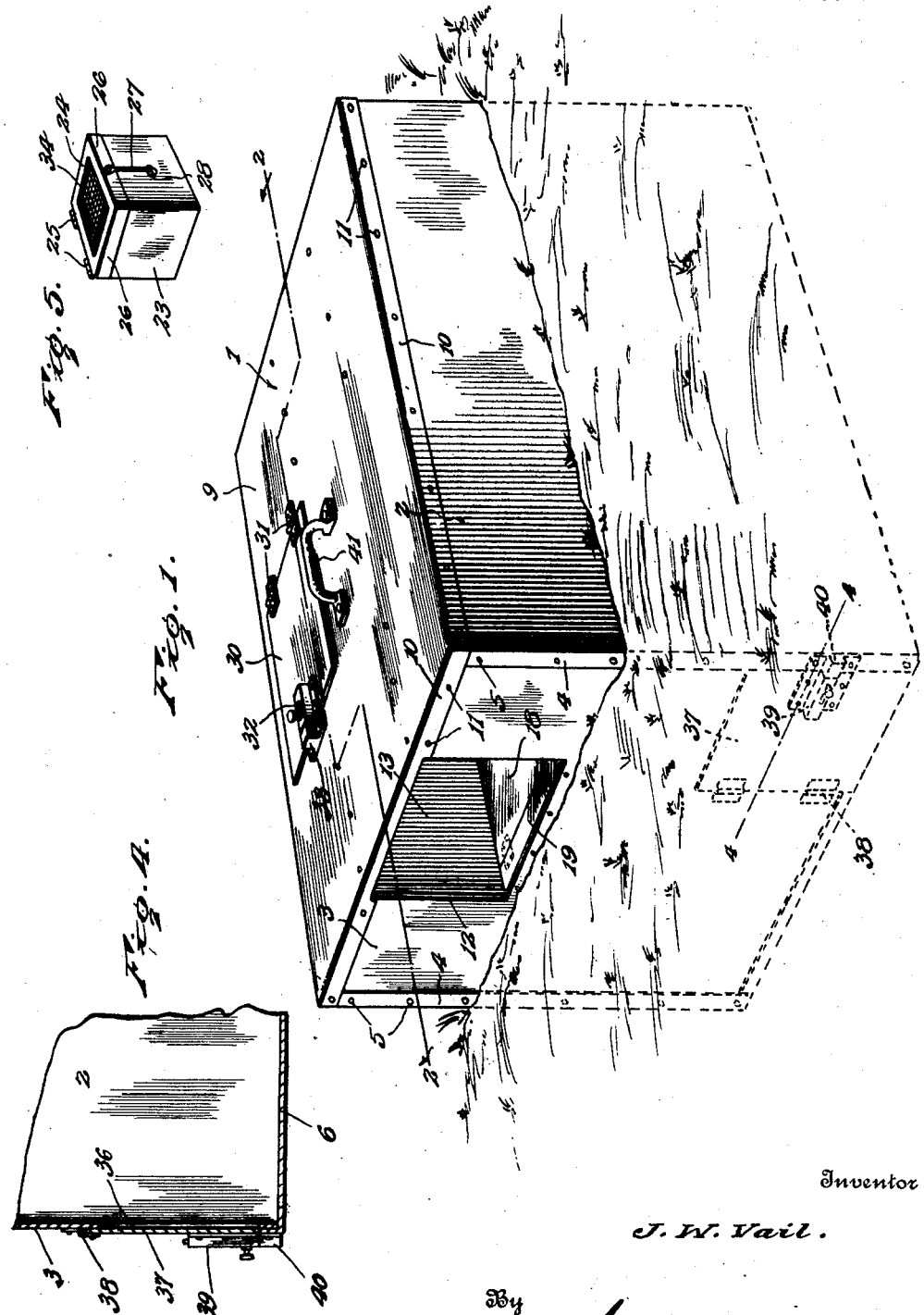
Figure 1 is a perspective view showing the improved trap ready for use.

The housing or casing which is indicated in general by the numeral 1 is formed of sheet metal which may be galvanized iron or any other metal which will not readily corrode or rust. The side walls 2 are joined to the end walls 3 by flanges 4 through which rivets or other suitable fasteners 5 are passed and the bottom 6 upon which the side and end walls rest is formed with marginal flanges 7 extended upwardly in overlapping relation to the walls and secured thereto by rivets or other suitable fasteners 8. The top 9 is also provided with marginal flanges 10 which extend downwardly in overlapping relation to the side and end walls and are secured thereto by rivets 11. While it is stated that the walls and top and bottom are preferably formed from separate strips of sheet metal having flanges through which fasteners pass, it will be understood that if desired the walls could be formed from a single strip suitably bent to form a housing of the desired dimensions and the top and bottom joined to them or formed from side extensions of the blank from which the walls are formed. Each of the end walls 3 is formed in its upper end portion and intermediate its width with an opening 12 which constitutes an inlet through which the animals to be entrapped will pass. By having the openings 12 formed in the upper portion of the end walls, the body or casing may be embedded in the ground, as shown in Fig. 1, and the openings will be close to the surface of the ground so that, if the trap is embedded in the ground intermediate the length of an animal runway, the openings will communicate with interrupted portions of the runway and animals moving along the runway may readily pass into the openings.

Figure 2:
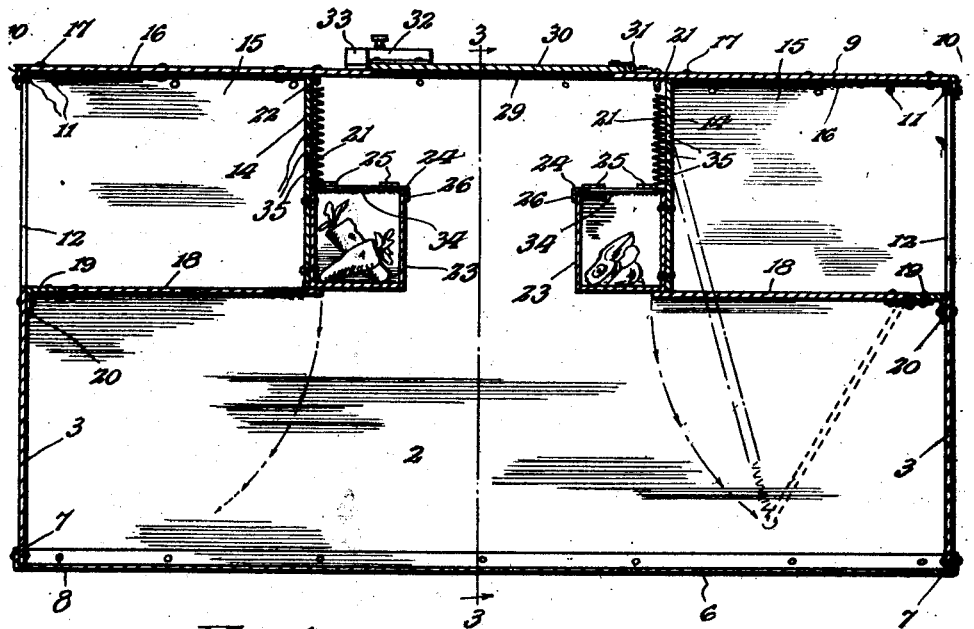
Fig. 2 is a longitudinal sectional view taken on the line 2—2 of Fig. 1.
Figure 3:
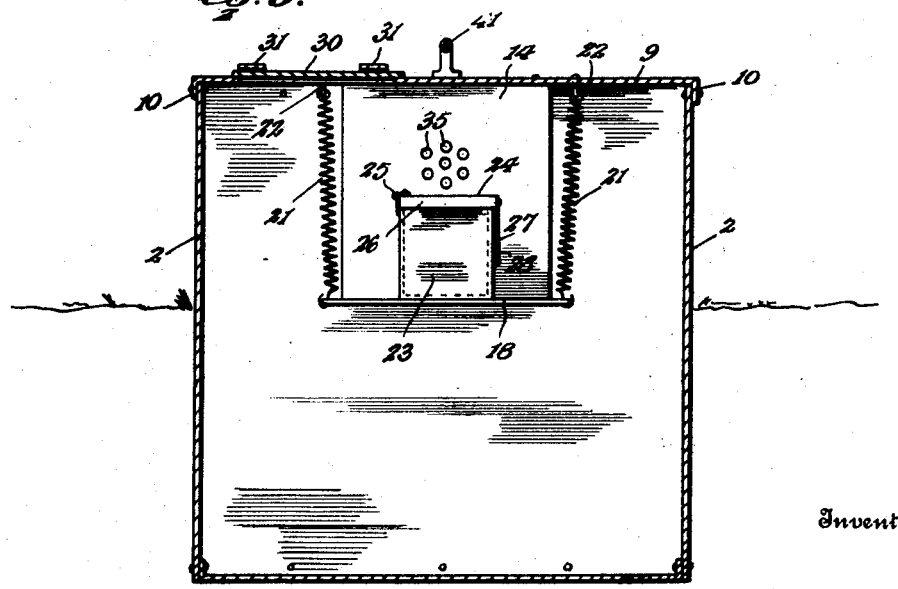
Fig. 3 is a transverse sectional view taken on the line 3—3 of Fig. 2.

The tunnels 13 which extend inwardly from the openings 12 are also formed of sheet metal and each includes an inner wall 14 from which extend side walls 15 having their upper portions bent to provide flanges 16 secured against the top 9 by rivets 17 at opposite sides of the openings 12. The bottom 18 of each tunnel is in the form of a trap door hingedly connected with the horizontally disposed ledge 19 of a bracket 20 secured to the end wall and extending inwardly therefrom at the lower edge of the inlet opening. The trap doors are of greater width than the tunnels, as shown in Fig. 3, and project beyond the inner walls 14, as shown in Fig. 2. Therefore, the platform has abutting engagement with the lower edges of the side and inner end walls of the tunnels and are prevented from moving upwardly beyond a horizontal position. Springs 21 are suspended from eyes 22 carried by the top 9 at opposite sides of the tunnels, and these springs have their lower ends engaged with the projected corner portions of the trap doors and serve to normally retain the trap doors in an elevated position. When, however, an animal of sufficient weight enters a tunnel and walks along the trap door towards its inner end, the weight of the animal will overcome the action of the springs and the trap door will be swung downwardly, as indicated by dotted lines in Fig. 2, so that the animal will be precipitated into the lower portion of the housing. As soon as the animal leaves the trap door, the springs will return the same to the elevated position and the animal will be confined in the housing and prevented from escaping. A small animal which it is not desired to entrap will not have sufficient weight to move the trap doors downwardly against the action of the springs and, therefore, animals which are smaller than it is desired to entrap may readily enter and leave the tunnels. If the springs applied to the trap doors are either too strong or too weak to permit of the trap being used for animals of a certain size or species, they may be removed and others of an appropriate strength substituted.

It is desired to provide bait in order to lure the animals into the tunnels and it is further desired to prevent the animals from having access to the bait and consuming the same. Therefore, there has been provided bait boxes 23 which are preferably formed of sheet metal and each of which is provided with a top or closure 24 hinged to the body of the bait box, as shown at 25, and releasably held closed with its flanges 26 extending downwardly in overlapping relation to the side walls of the body. In the present illustration the doors or closures 24 are held in the closed position by hooks 27 pivotally secured to the depending forward flanges of the closures and adapted to be swung into engagement with lips 28 struck outwardly from the front walls of the bait boxes. An opening 29 is formed in the top 9 of the housing intermediate the inner ends of the tunnels so that ready access may be had to the bait boxes and this opening is normally closed by a door 30 hinged to the top, as shown at 31, and adapted to be secured in a closed position by a latch 32 secured to the free end of the door and adapted to engage a keeper 33 mounted upon the top 9. When the door 30 is opened, bait which is suitable to attract the animals it is desired to catch is placed in the bait boxes and the doors 24 closed and secured. Each door is formed with a perforated portion 34 which preferably consists of wire netting secured to the inner face of the door across an opening formed therein or the door may have a plurality of small openings punched or otherwise formed therein. Openings 35 are formed in the inner walls of the tunnels above the bait boxes and, therefore, although the animals may smell the bait they cannot reach the same when they enter the tunnels or after they have been precipitated into the body of the housing and, therefore, the bait will not be consumed. The animals may be removed from the trap through the opening 29 with the trap remaining embedded in the ground or the trap may be lifted from the pit in which it is resting and the animals removed through an opening 36 formed in a lower corner portion of one of the end walls and normally closed by a door 37. The door 37 is hingedly mounted, as shown at 38, so that it may be opened and closed and is releasably held closed by a latch 39 carried by the door and adapted to engage a keeper 40 secured to the end wall, as shown in Figs. 1 and 4. There has also been provided a handle 41, by means of which the trap may be readily lifted and carried. It will thus be seen that the trap will be light in weight but strong and durable and very efficient in its operation.

Having thus described the invention, I claim:

1. A trap comprising a housing including a bottom, a top, and walls connecting said top and bottom, opposed portions of said walls being formed with inlet openings to register with portions of an animal runway when the housing is embedded in the ground from its bottom to approximately the lower edges of the inlet openings, ledges extending inwardly from the lower edges of said inlet openings, tunnels extending inwardly from the opposed wall portions about said inlet openings and each having a bottom pivotally connected with a cooperating ledge and yieldably held in a raised substantially horizontal position and adapted to be swung downwardly by the weight of an animal and drop the animal into said housing, bait-holding means in said housing adjacent the inner ends of said tunnels and visible through the openings in their inner walls, the top of said housing having an opening formed therein intermediate the inner ends of said tunnels for communication with the interior of the housing and access to said bait-holding means, one wall portion being formed with an opening adjacent the bottom of the housing, and closures movable into and out of closing relation to the last-mentioned wall opening and opening in the top of the housing.

2. A trap comprising a housing including a bottom, a top, and walls connecting said top and bottom, one wall having an inlet opening formed therein adjacent its upper end, a ledge extending inwardly from the lower edge of said opening, a tunnel in said housing having an inner end wall and side walls extending therefrom and secured to the top of said housing and to the wall thereof at opposite sides of the inlet opening formed therein, a trap door hinged to said ledge and forming a drop bottom for said tunnel and having portions extending from the side walls of the tunnel at the inner end thereof, springs suspended in said housing and engaged with the extended side portions of said trap door to yieldably retain the same in a raised position, a bait box secured to the inner face of the end wall of said tunnel and having a closure door provided with a perforated portion, the inner wall of said tunnel having a perforated portion above said bait box and said housing having an opening for access to said bait box and the interior of the housing, and a closure for the last-mentioned opening movable into and out of a closed position.

3. A trap comprising a housing including a bottom, side and end walls, and a top, said end walls being formed with openings to provide inlets, brackets secured against the inner faces of said end walls and having ledge portions extending inwardly of the body at the lower edges of said inlet openings, tunnels extending longitudinally in said housing and each having side walls secured at opposite sides of an inlet opening and an inner end wall having perforations formed therein, a trap door hinged to the ledge portion of each bracket and constituting bottoms for said tunnels, springs suspended in said housing and engaged with the inner ends of said trap doors at the sides thereof and yieldably supporting the trap doors, bait boxes secured against the inner faces of said inner tunnel walls below the perforations formed therein and each including a receptacle and a closure for the upper end thereof movable into and out of closed position and having a perforated portion, said housing having an opening between the inner ends of said tunnels for access to said bait boxes and the interior of the housing, and a closure for the last-mentioned opening said housing movable into and out of a closed position.

In testimony whereof I affix my signature.

JOHN WESLEY VAIL. [L. S.]